May 4, 1926.
G. C. CROSS
1,583,446
PHOTOGRAPHIC ENLARGING EASEL
Filed June 13, 1921        3 Sheets-Sheet 2
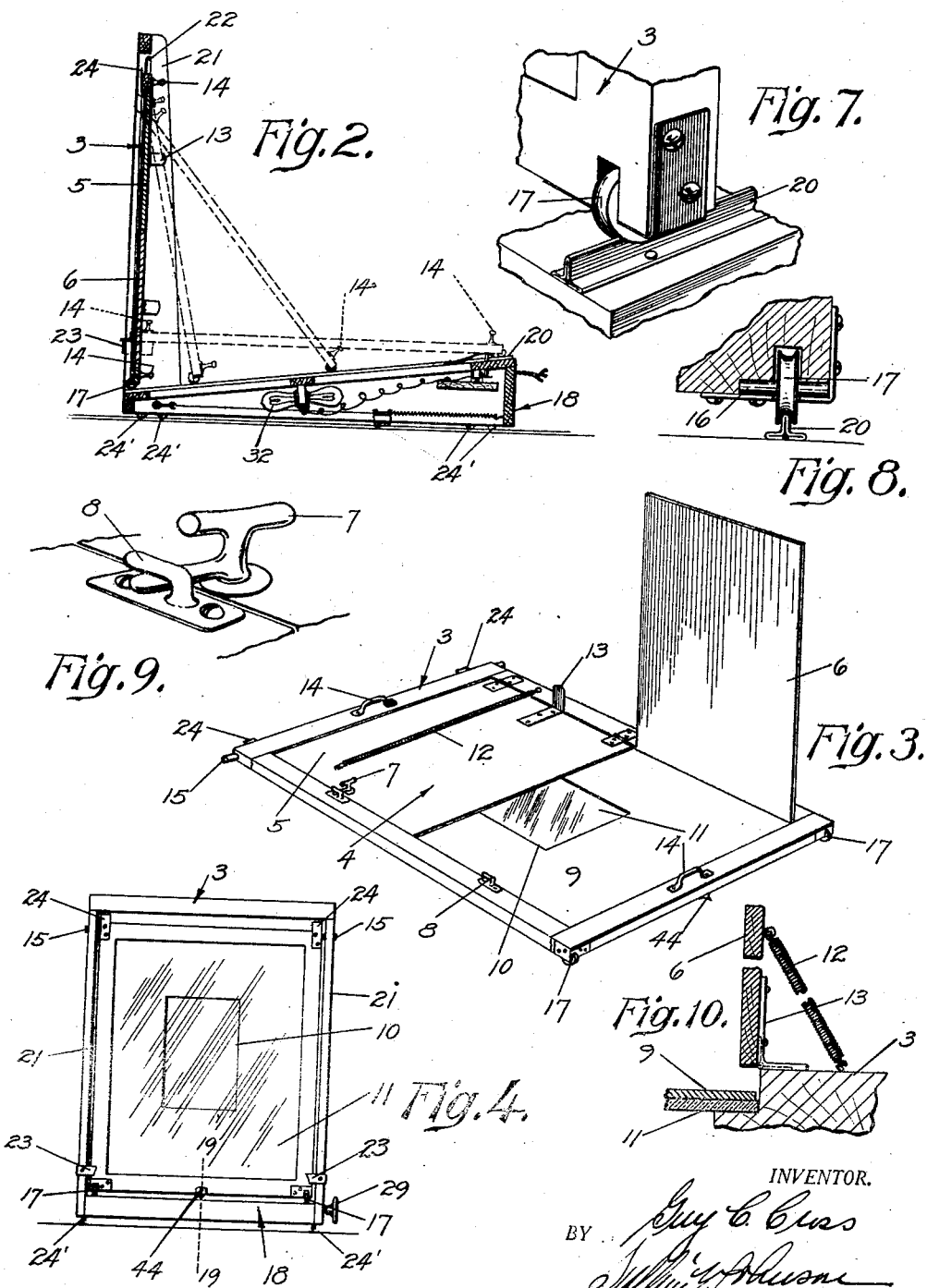
INVENTOR.
BY Guy C. Cross
ATTORNEY.

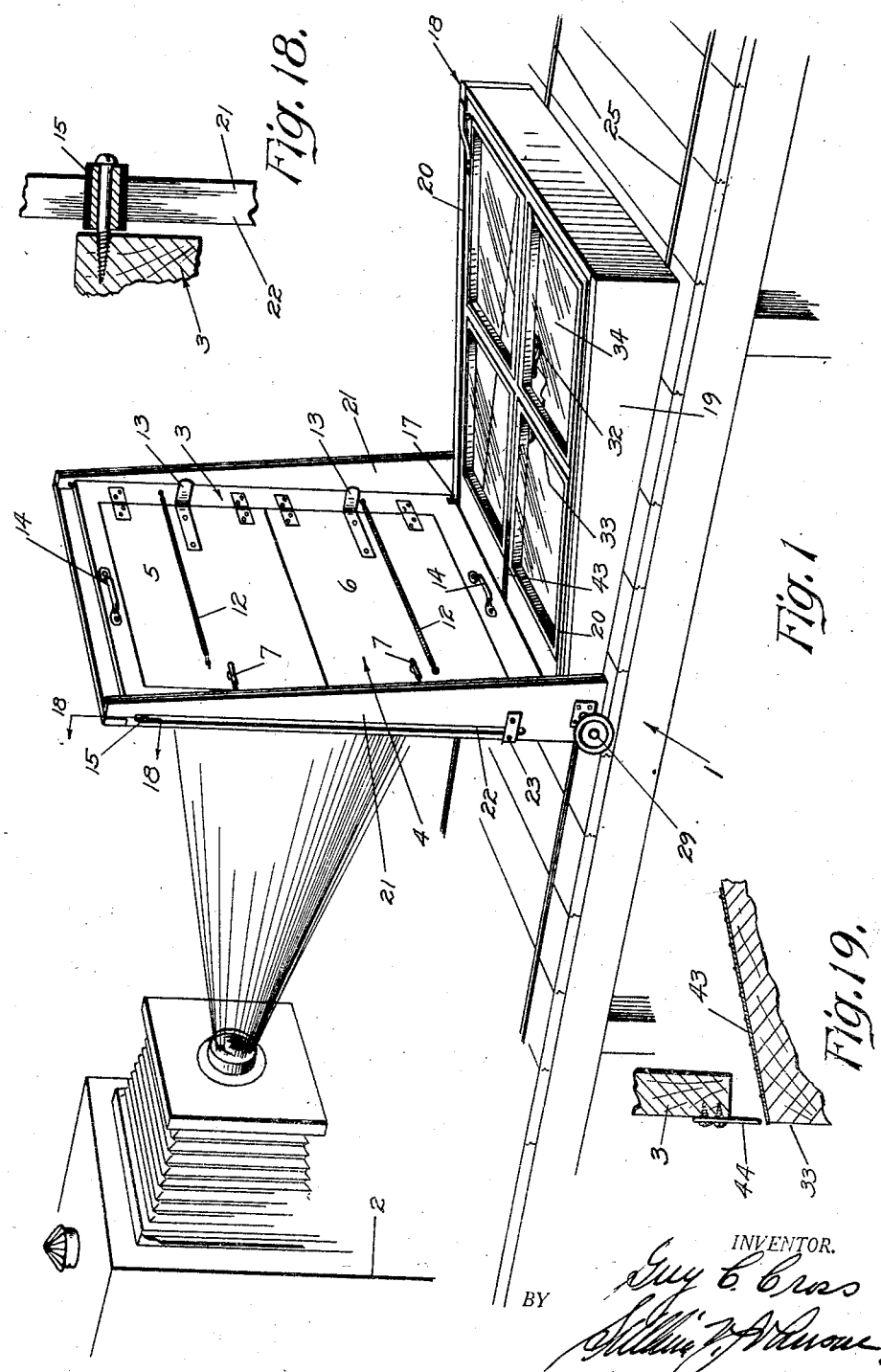

May 4, 1926.
G. C. CROSS
1,583,446
PHOTOGRAPHIC ENLARGING EASEL
Filed June 13, 1921
3 Sheets-Sheet 3
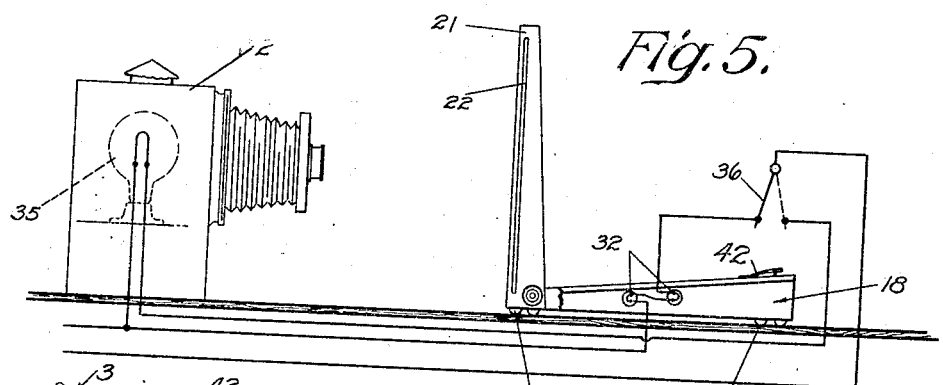
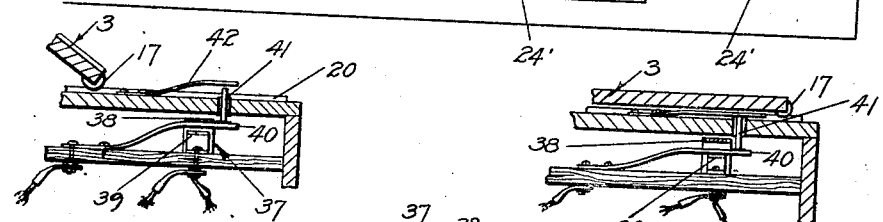
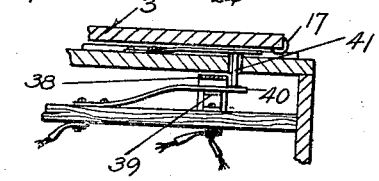
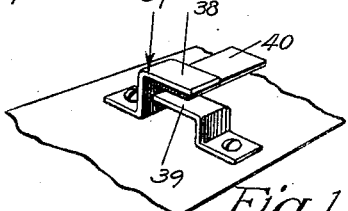
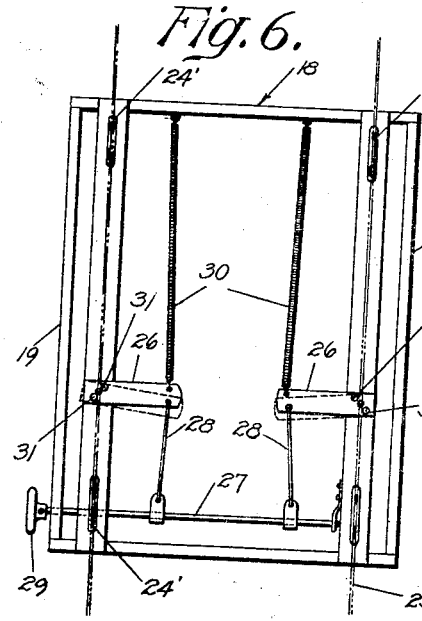
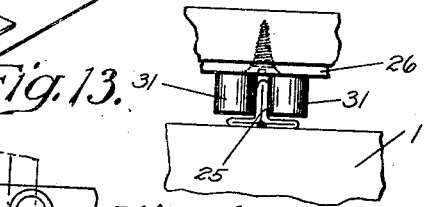
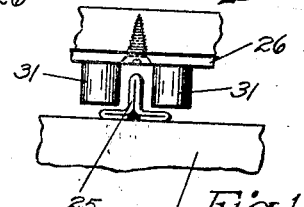
INVENTOR.
Guy C. Cross
BY
ATTORNEY.

Patented May 4, 1926.

1,583,446

UNITED STATES PATENT OFFICE.

GUY C. CROSS, OF DENVER, COLORADO.

PHOTOGRAPHIC ENLARGING EASEL.

Application filed June 13, 1921. Serial No. 477,102.

*To all whom it may concern:*

Be it known that I, GUY C. CROSS, a citizen of the United States, residing at Denver, in the county of Denver and State of Colorado, have invented new and useful Improvements in Photographic Enlarging Easels, of which the following is a specification.

The present invention is directed to improvements in photographic enlarging easels.

The primary object of the invention is to provide an easel of this character so constructed and arranged that it may be moved easily and quickly from a vertical or operative position to a horizontal or loading position with respect to the enlarging camera.

A further object of the invention is to provide a device of this nature so mounted on its carriage that it will be balanced during its movement, whereby it can be operated quickly, and with ease.

Another object of the invention is to provide an easel which can be held in adjusted angular relations with respect to the camera to correct incorrect perspectives of the photograph to be enlarged.

Still another object of the invention is to provide an easel of this kind so constructed that the sensitized paper can be properly positioned thereon, and held perfectly flat, it being a well known fact that the paper will curl, and it is a tedious operation to properly place this paper on the customary easel.

A still further object of the invention is to provide an easel so arranged that it may be moved in a direction away from the camera when the easel is to be loaded, thereby permitting the easel to be used in a position close to the camera.

Still another object of the invention is to provide a device of this type so constructed that it can be moved towards or away from the camera, and positively locked in a selected position.

Another object of the invention is to provide an easel having means for illuminating the same when in its loading position to assure proper placing of the sensitized paper relative to the mask.

With these and other objects in view this invention consists in the features of construction and operation set forth in the following specification and illustrated in the accompanying drawings, forming a part hereof, in which:—

Figure 1 is a perspective view of the device.

Figure 2 is a longitudinal sectional view.

Figure 3 is a perspective view of the easel removed from the carriage.

Figure 4 is a front view of the easel, showing one section of the back raised.

Figure 5 is a diagrammatic view showing the illuminating circuit.

Figure 6 is a bottom plan view of the carriage.

Figure 7 is a fragmentary perspective view of one lower corner of the easel.

Figure 8 is a transverse sectional view through the same.

Figure 9 is a fragmentary perspective view of the catch and latch.

Figure 10 is a detail sectional view through one section of the back, showing the same in its raised position.

Figure 11 is a detail view of the controller showing the same in its position for illuminating the camera lamp.

Figure 12 is a similar view showing the same in a position for illuminating the carriage.

Figure 13 is a fragmentary perspective view of the spring finger and contacts of the circuit controller.

Figures 14, 15, 16, and 17 are detail views of the shoes for locking the carriage against accidental movement, the shoes being shown in their locked and unlocked positions relative to the rails.

Figure 18 is a sectional view on line 18—18 of Fig. 1.

Figure 19 is a sectional view on line 19—19 of Fig. 4.

Referring to the drawings, 1 designates a bench or the like, and 2 the conventional form of enlarging camera, which is fixed thereto in any suitable manner.

The easel per se comprises a rectangular frame 3, and hingedly connected to one side rail thereof is a back 4 consisting of sections 5 and 6, each being provided adjacent their free edges with pivoted latches 7, which are adapted to co-act with the catches 8 carried by the adjacent side rail of the frame 3. When the latches 7 are engaged with the catches 8 the sections of the back will hold the sensitized paper perfectly flat on the mask 9, said mask having the desired size and shaped opening 10 formed therein, it being of course understood that the easel is provided with a glass front 11 which is suitably supported by the sides and ends of the frame 3, and upon which the mask rests.

The sections 5 and 6 of the back 4 have secured thereto one end of the coil spring 12, the other end thereof being secured to the side to which the sections are hinged, said springs serving to hold the sections in their raised or open positions when the sensitized paper is being placed upon the mask. The swinging movement of the sections are limited by stops 13 which are fixed to each section and are adapted to engage the adjacent side of the frame, as more clearly shown in Fig. 10.

The ends of the frame 3 have mounted thereon handles 14, which serve as convenient means for moving the easel from a vertical or operative position to a horizontal or loading position, or vice versa.

Rotatably supported by the normally upper end of the frame 3, and adjacent the corners thereof are rollers 15, while the normally lower corners of the frame carry axles 16 upon which are mounted grooved wheels 17, the manner of mounting said axles being clearly shown in Fig. 8.

A carriage 18 is used in connection with the easel, the upper edges of its sides 19 being inclined, and have mounted thereon tracks 20, and upon which the wheels 17 travel when the easel is being moved from a vertical to a horizontal position, or vice versa.

Rising from the forward or minor end of the carriage are spaced uprights 21 in which are formed vertical slots 22, and it is in these slots that the rollers 15 are adapted to travel as the easel is operated. Thus it will be seen that when the easel is moved from its operative or vertical position to its loading position that the rollers 15 will travel in the slots 22 while the wheels 17 travel on the tracks 20. Carried by the uprights 21 are angle stop plates 23 which are adapted to be engaged by the stops 24 carried by the easel, whereby the easel will be in a true horizontal position when loading.

The carriage 18 has associated therewith grooved wheels 24 which are adapted to travel on the rails 25, said rails being secured to the bench 1, whereby the carriage and associated easel can be moved towards or away from the camera 2. After the easel has been positioned properly with respect to the camera 2 it is deemed desired to lock the carriage in a selected position. In order to accomplish this the carriage has pivotally connected thereto diametrically opposed levers 26 which are normally in direct alinement, but may be shifted upon rocking the shaft 27, thus operating the links 28 which pivotally connect the shaft and levers, as shown in Fig. 6.

The shaft 27 is journaled transversely of the carriage 18, and has fixed to one end a hand wheel 29 through the medium of which said shaft can be rocked, coil springs 30 being provided to return the levers 26 to their normal positions. These springs are connected respectively with the levers 26 and carriage 18, as clearly shown in Fig. 6.

Each lever 26 has fixed adjacent its pivoted end a pair of spaced diagonally opposed brake shoes 31, the spaces therebetween being occupied by the rails 25. Since the shoes are diagonally opposed it is obvious that said shoes normally grip the rails on opposite sides, thereby locking the carriage 18 with said rails, and holding the carriage and associated easel against accidental movement. When it is desired to move the carriage it is only necessary to rock the shaft 27 through the medium of the hand wheel 29, thereby shifting the levers 26, whereupon the shoes 31 will be moved from engagement with the rails 25, thus permitting the device to be easily moved to different positions with respect to the camera 2, as the occasion may require.

Incandescent lamps 32, colored red, are suitably supported by the carriage, and centrally beneath the frame 33, said frame having ground glass panes 34 supported thereon, the purpose of which will appear later. Located in the camera 2 is an incandescent lamp 35, which is illuminated when desired upon closing the switch 36, shown in Fig. 5, the lamps 32 being connected in the same circuit. It is not thought necessary to describe in detail the circuit other than it controls the illumination of the lamps 32 and lamp 35 through the medium of the controller 37 associated with the carriage 18.

The controller comprises vertically spaced contacts 38 and 39, which are supported in any suitable manner on the carriage. Located between these contacts is a spring finger 40 which normally engages the contact 38, and when the switch 36 is closed the lamp 35 will be illuminated, but the lamps 32 will be dark. A pin 41 is carried by the finger, and is insulated therefrom, said pin having its upper end projected above the plane of the carriage 18, and at a point adjacent one of the tracks 20. A spring finger 42 is mounted on the carriage 18, and has its free end disposed above the upper end of the pin 41, said pin being adapted to be forced downwardly when the easel frame is in a horizontal or loading position, and in engagement with the finger 42, as shown in Fig. 12. It will be obvious that when the pin is forced downwardly the spring finger 40 will move out of contact with the contact 38 and into engagement with the contact 39, thus extinguishing the lamp 35 and illuminating the lamps 32.

As shown in Fig. 1, the camera 2 and easel are in their operative position, and at which time the easel is in its vertical position. When in this position the camera is focused relative to the opening 11 of the mask 10, the sections of the back 4 being white, thus permitting this to be readily accomplished. After the proper focus has been obtained the handles 14 are grasped, and upon exerting slight stress thereon the easel will move easily from a vertical position to a horizontal position, as shown in Fig. 2. Owing to the fact that the tracks 20 are inclined towards the uprights 21 it is obvious that the easel will be balanced during its movement, as the wheels 17 move upwardly thereon, thereby permitting the easel to be operated quickly and with ease. After the easel is in its horizontal position, the sections 5 and 6 of the back 4 are unlocked, and due to the spings 12 the sections can be conveniently raised, the open swinging movement thereof being limited by the stop plates 13.

The sensitized paper is then placed on the mask 9, and since the lamps 32 are illuminated when the easel is in its horizontal or loading position, the paper can be properly placed thereon, the proper border being readily discernible. This sensitized paper ofttimes curls, but since the back is formed from sections, one section may be first lowered and locked, and then the other so that the paper will be laid and held perfectly flat on the mask.

After the easel has been loaded and the enlargement is to be made, the handles 14 are grasped and the easel is swung or moved from its horizontal or loading position to its vertical or operative position, said easel being equally as well balanced as when moved conversely. It will be obvious that as soon as the easel is moved from engagement with the finger 42 that the pin 41 will move upwardly thus disengaging the contact 39 and extinguishing the lamps 32, said finger then moving into engagement with the contact 38, thereby illuminating the lamp 35. In this manner the lamps 32 and lamp 35 will be alternately illuminated.

It is ofttimes desired to make a number of enlargements, and it is necessary to have the easel positioned at the same angular relation to the uprights 21 for each enlargement. In order to do this a graduated scale 43 is fixed to the central rail of the frame 33, and adapted to coact with this scale is a pointer 44, which is fixed to normally lower end of the easel. Thus the pointer can be registered with the selected degree on the scale after each loading operation to assure the proper angle of the easel.

Under normal conditions the scale is not utilized, but is necessary when correcting incorrect perspectives.

Since the tracks 20 are inclined it is obvious that the easel will be balanced, and can be held without the aid of securing devices at different desired angles relative to the uprights.

What is claimed is:—

1. In an easel of the class described, means for moving the easel from a vertical position to a horizontal position, means for balancing the easel during such movement, and means governed by the inclination of the easel holding the easel in selected balanced positions.

2. In a device of the class described, the combination with a movable carriage having inclined tracks thereon, of an easel supported by the carriage and movable on the tracks from a vertical to a horizontal position, and means for guiding the easel during its movement.

3. In a device of the class described, the combination with a carriage having inclined tracks thereon and having uprights supported thereby, of an easel having one end slidably engaged with the uprights and its other end movable on the tracks, said easel being capable of being moved from a vertical to a horizontal position and balanced during such movement.

4. In a device of the class described, the combination with a carriage including inclined tracks, uprights supported by the carriage, of an easel having its ends slidably engaged respectively with the uprights and tracks, whereby the easel is movable from a vertical to a horizontal position, said easel being capable of being supported in angular relation also with the carriage and uprights.

5. In a device of the class described, the combination with a carriage movable towards or away from an enlarging camera, independent means for illuminating the camera and carriage, of an easel supported by the carriage and movable from a vertical to a horizontal position, said easel being adapted to control the illumination of the camera and carriage when in certain positions, as and for the purpose set forth.

6. In a device of the class described, the combination with a carriage, means for illuminating the carriage, of an easel movable from a vertical position to a horizontal position on the carriage, said easel when in one position serving to actuate the illuminating means, whereby the easel can be loaded when illuminated from the carriage illuminating means.

7. In a device of the class described, the combination with a carriage having uprights and tracks associated therewith, of an easel slidably engaged with the uprights and tracks for movement from a vertical to a horizontal or loading position, the tracks being disposed in angular relation with respect to the uprights to balance the easel during its movement.

8. In a device of the class described, the combination with a carriage having uprights and tracks associated therewith, an easel having its respective ends slidably engaged with the uprights and tracks, means for illuminating the interior of the carriage, said easel being movable from a vertical position to a horizontal position over the carriage to be illuminated by the carriage illuminating means, as and for the purpose set forth.

9. In a device of the class described, the combination with a carriage having uprights and tracks associated therewith, of an easel slidably engaged with the uprights and tracks for movement from a vertical to a horizontal position, as and for the purpose set forth.

10. In a device of the class described, the combination with a carriage having tracks thereon and uprights supported thereby, of an easel having one end slidably engaged with the uprights and its other end movable on the tracks, said easel being capable of movement from a vertical position to a horizontal position.

11. In a device of the class described, the combination with a carriage, of an easel adjustably mounted thereon and movable from a vertical to a horizontal position over the carriage, and means carried by the carriage for illuminating the easel when in its horizontal position.

12. A photographic copy holder comprising a bracket having L-shaped side bars, a frame slidable freely on the arms of said bars, said frame and the bars having co-acting means to hold the frame either in vertical position on the vertical arms or in horizontal position on the horizontal arms of said bars and readily detachable from either of such positions, said frame having means for holding copy.

In testimony whereof I have hereunto set my hand.

GUY C. CROSS.